United States Patent
Dobbelaar

(10) Patent No.: US 6,538,672 B1
(45) Date of Patent: Mar. 25, 2003

(54) METHOD AND APPARATUS FOR DISPLAYING AN ELECTRONIC PROGRAM GUIDE

(75) Inventor: Astrid M. F. Dobbelaar, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/498,879

(22) Filed: Feb. 7, 2000

(30) Foreign Application Priority Data

Mar. 16, 1999 (EP) .......................................... 99200800
Mar. 3, 1999 (EP) .......................................... 99200610
Feb. 8, 1999 (EP) .......................................... 99200343

(51) Int. Cl.$^7$ .............................................. G09G 5/00
(52) U.S. Cl. ....................... 345/810; 345/716; 345/817; 345/828; 345/845
(58) Field of Search ................................. 345/716, 719, 345/720–721, 764, 810, 835, 769, 788, 799, 800, 798, 805, 722, 817, 828, 845

(56) References Cited

U.S. PATENT DOCUMENTS

| | | | |
|---|---|---|---|
| 5,146,210 A | | 9/1992 | Heberle |
| 5,533,183 A | * | 7/1996 | Henderson, Jr. et al. .... 345/854 |
| 5,585,838 A | * | 12/1996 | Lawler et al. ................. 725/54 |
| 6,005,631 A | * | 12/1999 | Anderson et al. ............. 725/53 |
| 6,057,831 A | * | 5/2000 | Harms et al. ................ 345/720 |
| 6,064,376 A | * | 5/2000 | Berezowski et al. .......... 725/42 |
| 6,081,263 A | * | 6/2000 | LeGall et al. ............... 345/760 |
| 6,141,007 A | * | 10/2000 | Lebling et al. ............. 345/792 |
| 6,151,059 A | * | 11/2000 | Schein et al. ................. 725/37 |

FOREIGN PATENT DOCUMENTS

EP 0838945 A2 4/1998 ............ H04N/5/44

OTHER PUBLICATIONS

"An Interactive Menu–Driven Remote Control Unit for TV–Receivers and VC–Recorders", Gunter Zeisel Et Al, 8087 IEEE Transactions on Consumer Electronics, 1988 Int'l Conf. on Consumer Electronics, Part 1, 34, Aug. 1988 No. 3, New York, NY, USA, pp. 814–818.

* cited by examiner

Primary Examiner—Kristine Kincaid
Assistant Examiner—Nhon Nguyen
(74) Attorney, Agent, or Firm—Russell Gross

(57) ABSTRACT

The invention relates to a method of and apparatus for displaying an electronic program guide. The method includes the step of displaying an axis (21) on the screen (20) which corresponds to a particular program attribute (e.g. channel name, broadcast time, program category, program title). The user may select a value from the axis, causing a pictogram (27) to be displayed, showing information about programs corresponding to the selected value. The pictogram's position corresponds to the position of the selected value. A new value may be selected by dragging the pictogram and/or shifting the axis.

14 Claims, 3 Drawing Sheets

METHOD AND APPARATUS FOR DISPLAYING AN ELECTRONIC PROGRAM GUIDE

FIELD OF THE INVENTION

The invention relates to a method of displaying an electronic program guide, comprising the step of receiving attribute values relating to program attributes (e.g. channel name, broadcast time, program category, program title).

The invention further relates to an apparatus for receiving a plurality of programs, comprising decoding means for receiving and decoding attribute values relating to program attributes.

BACKGROUND OF THE INVENTION

Such a method and apparatus are well known. For example, known television receivers and set-top boxes comprise an electronic program guide (EPG) which is capable of receiving and decoding program data, such as channel number and broadcast time, relating to programs which will be transmitted in the near future. Generally, such an EPG shows a list of program titles and the clock-times, indicating at which time and by which channel the programs will be transmitted. For example, U.S. Pat. No. 5,808,608 discloses a television receiver capable of showing said data in a so called grid TV guide, comprising an array of cells, each cell containing program data relating to a distinct program.

A disadvantage of the known method and apparatus is that a lot of information is presented, particularly in a textual format, which makes it hard for a user to get a quick overview of programs which might be of interest to him. Furthermore, scrolling of the known EPGs is cumbersome, because it involves redrawing the entire data area, whereby some data are moved to another position, while other data are removed or new data are added. This is distracting and causes the user to loose focus easily. Scrolling proceeds by fits and starts, determined by the dimensions of cells or columns, which leads to a further deterioration of the user-friendliness.

OBJECT AND SUMMARY OF THE INVENTION

It is an object of the invention to provide a method and apparatus of the type defined in the opening paragraph which allow the user to search an EPG for desired programs in a more convenient way. To that end the method according to the invention is characterized in that
the method further comprises the steps of:
displaying values relating to a selected program attribute on a display screen along a coordinate axis;
user-operably selecting a value of said program attribute; and
displaying a pictogram representative of a program which corresponds with the currently selected value, the pictogram's position having a coordinate along said coordinate axis which corresponds to the currently selected attribute value.

The method according to the invention thus presents an axis and a pictogram on the TV screen. The rest of the TV screen may show a suitable background or it may remain dedicated to the currently selected program, allowing the user to keep viewing the program. The axis may have any length, direction and position on the screen, but preferably, the axis is located near and parallel to one of the borders of the TV screen, to minimize the disturbance of the main picture. The axis may have any shape, for example, linear or, curved, or it may have multiple segments extending in different directions, for example, along different borders of the screen. The axis may be assigned any program attribute, e.g. the program category, broadcast time or the service (or program) name. Along the axis, values of a selected attribute are distributed, e.g. category names, clock-times or channel names. The axis may be, for example, a line adjacent said values, or a semi-transparent bar enclosing said values. Some or all of the other elements of the electronic program guide, such as the pictogram and the values along the axes, may be semi-transparent too. One of the values along the axis is made more prominent in some way, indicating that this value is the currently selected one. For example, the value could be highlighted, enlarged, or shifted. Additionally, it can be connected to the pictogram by means of a line or bar, to clearly indicate that the contents of the pictogram corresponds to the currently selected value. If the broadcast time attribute is assigned to the axis, the clock-times may correspond to half hours, while additionally some indication of the date and/or day of the week may be displayed. The content of the pictogram may be textual information, e.g. attribute values related to other program attributes, or still pictures or preview motion pictures which are transmitted along with the EPG data. Generally, multiple programs correspond to the selected attribute value. For example, if the currently selected attribute value is a clock-time, the corresponding programs are the programs which are broadcast at that particular time. The system could select an arbitrary program from the corresponding programs, to be presented by the pictogram. Alternatively, the corresponding programs could be further filtered by means of a user-profile. For example, if the user-profile indicates that the user is only interested in programs of particular program categories, the system could show only corresponding programs belonging to those program categories. The remaining corresponding programs may be represented by subdividing the pictogram or showing multiple pictograms, possible in an overlapping way (e.g. like a visual representation of a card-file).

An embodiment of the method according to the invention is characterized in that the step of selecting a value comprises dragging the pictogram to a new position on the display screen, the new position's coordinate along said coordinate axis determining a newly selected value. The dragging of the pictogram may be performed by means of any suitable known input device or method, such as a computer mouse, a tracker ball, voice control or by the usual arrow-keys on the remote control, possibly after a predetermined command which starts the dragging of the pictogram and before another command or a time-out for ending the dragging operation. The same input device or method could be used to select the program represented by the pictogram, or request additional information about said program. Dragging the pictogram causes a value along the axis to be highlighted other then the currently selected value.

An embodiment of the method according to the invention is characterized in that the step of selecting a value comprises shifting said coordinate axis, the pictogram's coordinate determining a newly selected value. A similar input device may be used for shifting the axis. The axis may be shifted by dragging it, i.e. similar to dragging the pictogram. Alternatively, the axis could start shifting autonomously, in response to a suitable user command, indicating the desired direction. During the shifting of the axis, the position of the pictogram does not change, which provides a very smooth way of searching the EPG because the user simply needs to focus on the pictogram, waiting until it represents an interesting program.

A preferred embodiment of the method according to the invention is characterized in that the speed of shifting said coordinate axis is proportional to the difference between the pictogram's coordinate and the coordinate of a user-adjustable cursor position. If the coordinate of the cursor coincides with the coordinate of the currently selected value, the axis does not shift. If the cursor is moved, the axis starts shifting at a speed proportional to the said difference.

An embodiment of the method according to the invention is characterized in that when the pictogram is dragged until its coordinate reaches an extremity of the coordinate axis, the step of shifting said coordinate axis is performed to obtain a subsequent adjustment of the selected value. In this embodiment, the previous embodiments are combined in a very convenient way. Dragging the pictogram proceeds as usual until its coordinate reaches an extremity of the axis. At that moment, the axis starts shifting in a direction opposite to the direction of dragging, hence the selected value is adjusted as if the pictogram were dragged beyond the extremity of the axis. All of this is experienced by the user as one continuous movement.

An embodiment of the method according to the invention is characterized in that the method further comprises the step of receiving data to indicate a program of particular interest, and the step of displaying a symbol representing such a program at a position having a coordinate in accordance with the program's value relating to the selected program attribute. The symbol may be a dedicated icon or character to draw the user's attention to a program which might be of interest to him, and which icon or character is displayed at the position corresponding to the time and channel at which said interesting program is or will be transmitted. For example, a service provider can choose to promote particular events from his service/bouquet by displaying them within the EPG, as a moving or animated icon/AV-icon that regularly pops up at said position. This way the service provider can attract attention and pull viewers to a particular content he wants to 'advertise', e.g. to promote a particular program or product. The icon may be animated or flashing for some time to attract the user's attention. If the user is interested, he may drag the pictogram to the position of the symbol, to obtain more information about the suggested program. The symbol may stay on the screen for a predetermined period of time and then disappear again. Possibly, multiple symbols are presented simultaneously.

An embodiment of the method according to the invention is characterized in that the method further comprises a step of user-operably assigning another one of the program attributes to the coordinate axis. Hence, the user is allowed to choose which attribute is represented by the axis. For example, if the channel name attribute is assigned to the axis, the user is allowed to search programs transmitted by a selected channel, while if the broadcast time attribute is assigned to the axis, the user is allowed to search programs transmitted at a selected time.

An embodiment of the method according to the invention is characterized in that the method further comprises displaying values relating to a further one of the program attributes on the display screen along a further coordinate axis, the method proceeding similarly with respect to the combination of said coordinate axis and said further coordinate axis. By supplying two axes representing two different program attributes, the user is allowed to impose an additional constraint on the programs to be represented by the pictogram. Hence, the size of said set of corresponding programs is reduced. The additional axis behaves in a way similar to the first axis, so both axes can be shifted independently. Dragging the pictogram may influence the selected value of either one of the axes or the selected values of both axes at the same time, dependent on whether the pictogram's coordinate along each axis has changed.

An embodiment of the method according to the invention is characterized in that said program attribute is the channel number and said further program attribute is the broadcast time. The combination of these specific attributes guarantees that at most one program corresponds to the selected values, namely the program which is transmitted by the selected channel at the selected time. This could be the default assignment, applied after turning the system on.

The method according to the invention is particularly suitable for television receivers and set-top boxes. The invention may be applied, for example, to EPG data transmitted with TV broadcast signals, obtained from the Internet, from a dedicated digital subscriber line, or from a local storage device. The EPG data may relate to, for example, TV broadcast programs, near video on demand programs or locally stored programs. Furthermore, EPG data from various sources may be combined, for example, from broadcast signals and local storage.

BRIEF DESCRIPTION OF THE DRAWINGS

These and other aspects of the invention will be apparent from and elucidated by way of a non-limitative example with reference to a drawing in which.

DESCRIPTION OF EMBODIMENTS

Figure 1:
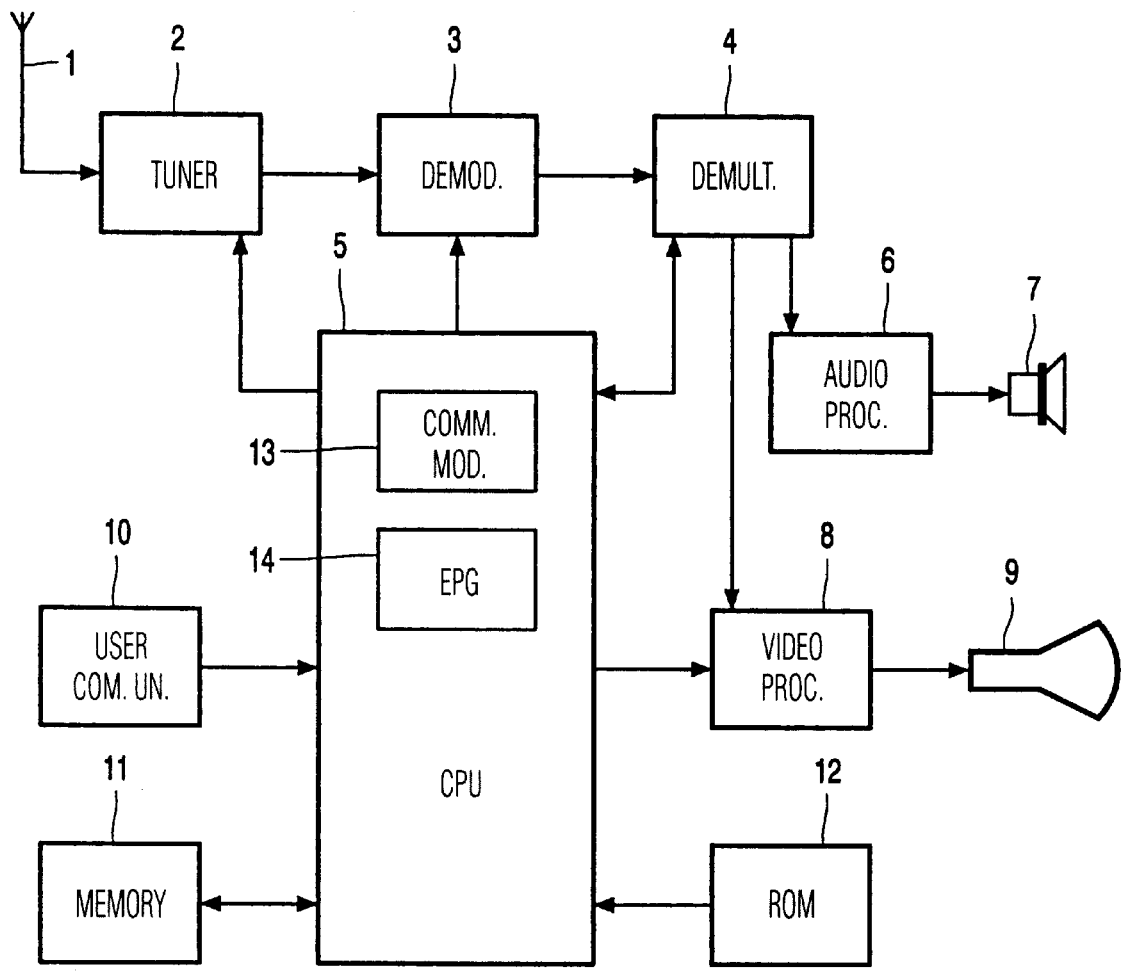
FIG. 1 shows a diagram of a television receiver as an embodiment of the apparatus according to the invention.

FIG. 1 shows a block diagram of a digital television receiver as an embodiment of the apparatus according to the invention. Digital broadcast streams, modulated upon radio frequency (RF) signals, are received from the ether by an antenna 1 or, alternatively, from a cable network. The broadcast streams may be formatted, for example, in accordance with the Digital Video Broadcasting (DVB) standard. A tuner 2 comprises a standard analog RF receiving device which is capable of receiving said RF signals and selecting one of them to be output to a demodulator 3. Which signal tuner 2 selects is dependent upon control data received from a central processing unit (CPU) 5. A demodulator 3 converts the analog signal into a digital packet stream, based on control signals received from the CPU 5. This packet stream is then output to a demultiplexer 4, which selects packets belonging to a particular program in accordance with control data received from the CPU 5, and decomposes the packet stream into elementary video, audio or data streams.

In an alternative embodiment of the invention, the packet stream is output from demodulator 3 directly to the CPU 5. In this embodiment, the CPU 5 performs the tasks of the demultiplexer 4, thereby eliminating the need for the demultiplexer 4.

In addition to broadcast signals, the television receiver may be adapted to receive signals from other sources too, for example, from a (digital) video recorder or DVD, from Internet, or from a digital subscriber line. Programs and program attributes need not be obtained from the same source. For example, attributes and attribute values relating to broadcast programs may be obtained from an internet site.

A video processor 8 decodes the video stream received from the demultiplexer 4 or from the CPU 5. In preferred embodiments of the invention, the video processor 8 is an MPEG-2 decoder; however, any decoder may be used as long as the decoder is compatible with the type of coding used to code the video data. Decoded video data is then transmitted to a display screen 9. An audio processor 6 decodes the audio stream received from the demultiplexer 4. Again, any decoder may be used as long as the decoder is compatible with the type of coding used to code the audio data. Decoded audio data is then transmitted to a speaker system 7.

The demultiplexer 4 outputs the elementary data stream to the CPU 5. The elementary data stream has two types of data: control data and content data. Content refers to, for example, interactive programs; control refers to tables in the multiplex which specify matters like the structure of the multiplex, the (RF) frequencies at which the channels are modulated, and the addresses at which the various content components and the (other) tables in the multiplex can be found. The CPU 5 comprises one or more microprocessors capable of executing program instructions stored in a read-only memory (ROM) 12. These program instructions comprise parts of software modules including, inter alia, a command module 13, and an EPG module 14. Data processed by said software modules, e.g. DVB-SI data and user profile information, may be stored in a non-volatile memory 11. The command module 13 is capable of controlling functions of the TV-set, like tuning and demultiplexing selection, and transmitting data to the video processor 8 to be presented on the screen 9. A user command unit 10 receives user commands, e.g. through a remote control (not shown), and transmits them to the command module 13 to be processed. For example, when the user enters a channel number, the command module 13 controls the tuner 2 and the demultiplexer 4 to select the corresponding broadcast stream and data packets therein, and sends graphical data to the video processor 8 to present feedback on the screen 9, e.g. the preset number, the channel name being displayed for a few seconds. The EPG module 14 interprets the DVB-SI data received from the demultiplexer 4 to collect information about the channels ('services' in DVB terminology) available in the received broadcast streams and about the programs ('events' in DVB terminology) scheduled for those channels.

Figure 2:
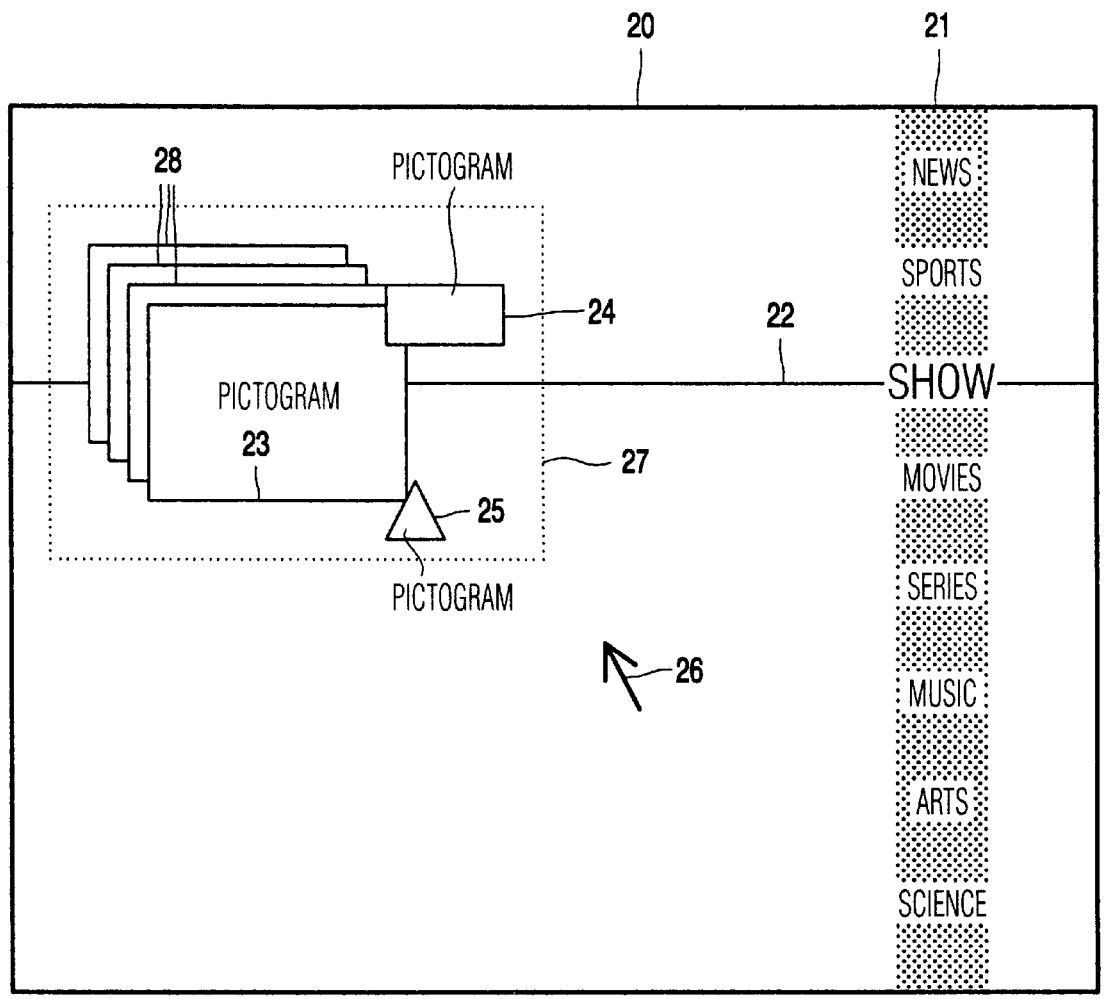
FIG. 2 shows an example of a screen representation of an EPG in accordance with an embodiment of the method according to the invention.

FIG. 2 shows an example of a screen representation of an EPG in accordance with an embodiment of the method according to the invention. Display screen 20 shows, after a suitable user command, an axis 21, along which names of program categories are displayed, being values of the program category attribute. In the example, the axis 21 is vertical and located adjacent the right border of the screen. The apparatus may comprise means (not shown) for moving the axis to another position, and/or change its direction. In the example, the third program category, 'show', is highlighted, indicating that this is the currently selected attribute value. At the same height, being the coordinate of the selected value, a pictogram 27 is displayed. The pictogram 27 is adapted to present information relating to programs which correspond to the selected value, i.e. programs which fall within the program category 'show'. The correspondence between the pictogram 27 and the selected value is emphasized by a line 22. The pictogram 27 comprises a number of smaller pictograms 23, 24, 25. The pictogram 23 is adapted to show a (moving) picture fragment from the program to be represented. The pictogram 24 is adapted to show some short textual information, e.g. the title. The pictogram 25 can be 'clicked' using a cursor 26 which can be controlled by means of the command unit 10, in order to obtain additional information about the program, for example, the channel name, broadcast time, and a short abstract. The additional information could be presented in, for example, a pop-up window, which may cover a larger part of the screen. However, this will not be perceived as a disturbance, because the user requested the information deliberately. The pictogram 25 may be a predetermined symbol, possibly animated to attract the user's attention to the additional information. The information presented in the pictogram 27 is transmitted, for example, along with the DVB-SI data and stored in the memory 11. Said information may comprise, inter alia, text, graphics, pictures, sound and video clips. The memory 11 may, for example, comprise solid-state memory, and/or magnetic or optical storage.

Generally, multiple programs will correspond to the selected attribute value. In the example, the set of corresponding programs comprises all shows which will be transmitted in the period covered by the EPG. The size of this set may be reduced by filtering the set in accordance with a user profile (not shown) containing further constraints on the programs to be selected, e.g. with respect to channels, language and broadcast time. If the filtered set still contains more than one program, additional pictograms 28 similar to the pictogram 27 could be presented, preferably at the same coordinate along the axis 21, i.e. at the same height as the pictogram 27. The additional pictograms 28 could be partially overlapping ('card-file' representation), as indicated in FIG. 2. Alternatively, the pictogram 27 could show information about the programs consecutively. For example, if the set of corresponding programs contains 3 programs, the pictogram 27 first presents a preview of the first program for e.g. 5 seconds, then a preview of the second program of the same duration, followed by a preview of the third program. After that, the cycle starts again. If the fragment shown in the pictogram 23 is a moving fragment and only one program corresponds to the currently selected attribute value, the fragment could be repeated until the EPG is removed from the display screen 20. If the pictogram 27 corresponds to a program which is currently broadcast, it may show the content of that program in real time, instead of stored preview information.

The pictogram 27 may be dragged by the user by means of the cursor 26 and the command unit 10. Dragging the pictogram 27 in the horizontal direction has no effect on the selected value, but may be desirable to move the pictogram 27 to a place where it is less disturbing for the main picture shown on the display screen 20. Dragging the pictogram 27 in the vertical direction causes the currently selected attribute value to be adjusted accordingly. If, in the example, the pictogram 27 is dragged downward, the selected value changes respectively to 'movies', 'series', 'music', etc. Similarly, if the pictogram 27 is dragged upward, the selected value changes respectively to 'sports' and 'news'. The information presented in the pictogram 27 is continuously adapted to the newly selected attribute value. The apparatus may comprise means (not shown) for accelerating the process of presenting information in the pictogram 27. For example, caching means may be provided for transferring video information from relatively slow background storage to fast solid state memory in advance, thereby possibly anticipating the direction of dragging. For example, if the pictogram is being dragged downward the caching means could start transferring information relating to movies, series and music programs to fast memory, based on the assumption that dragging will proceed in the same direction. A part of the memory 11 may be used only as a cache memory. If the memory size permits, the content of the cache memory may be preserved as long as possible for later (re)use. The speed of dragging may also be taken into account, to predict which information will have to be presented in the pictogram 27. For example, if the pictogram is dragged downward from 'movies' to 'music', the speed of dragging may render it unlikely that the dragging will suddenly pause at the intermediate category 'series', so that information relating to that category need not be presented, and hence not be transferred to the cache memory.

When the user is interested in a program corresponding to the information presented in the pictogram 27, he may be allowed to select said program for recording, immediate viewing or setting a reminder. The selection of said program may be achieved by issuing a suitable command, for example, by means of a dedicated button (not shown) of the user command unit 10, an on-screen menu, or voice recognition.

If the user moves the cursor 26 to the axis 21 and issues a suitable command, the axis starts shifting at a speed which is proportional to the distance between the cursor's vertical coordinate and the coordinate of the pictogram 27 and the currently selected value. For example, if the cursor is moved to the 'movies' value on the axis 21, the axis may shift upward at a speed at which each second one new value appears at the bottom end of the axis 21. If the cursor is moved to the 'series' value on the axis 21, the axis may shift upward at a speed at which each second two new values appear at the bottom end of the axis 21. The speed may be directly proportional to said distance, or may be any suitable function. For example, the shifting speed may be bound by a maximum value, or increase gradually (accelerate) as a function of time. The shifting may be circular, so that values which have been removed from the display screen 20, will reappear eventually. No shifting is performed if all values allowed for the attribute assigned to the axis 21 are already displayed.

Shifting of the axis 21 is also accomplished by dragging the pictogram 27 to a position having a coordinate which corresponds to an end of the axis 21. For example, if the pictogram 27 is dragged to the lower end of the display screen 20, the axis 21 starts shifting in an upward direction, while dragging the pictogram 27 to the upper end of the display screen 20 causes the axis 21 to be shifted in a downward direction.

The user may be allowed to assign another program attribute to the axis 21, e.g. using on-screen display menus, which is a well known way in the art for changing system parameters. In the same way the position and orientation of the axis 21 and the size of the pictogram 27 could be adjusted.

Figure 3:
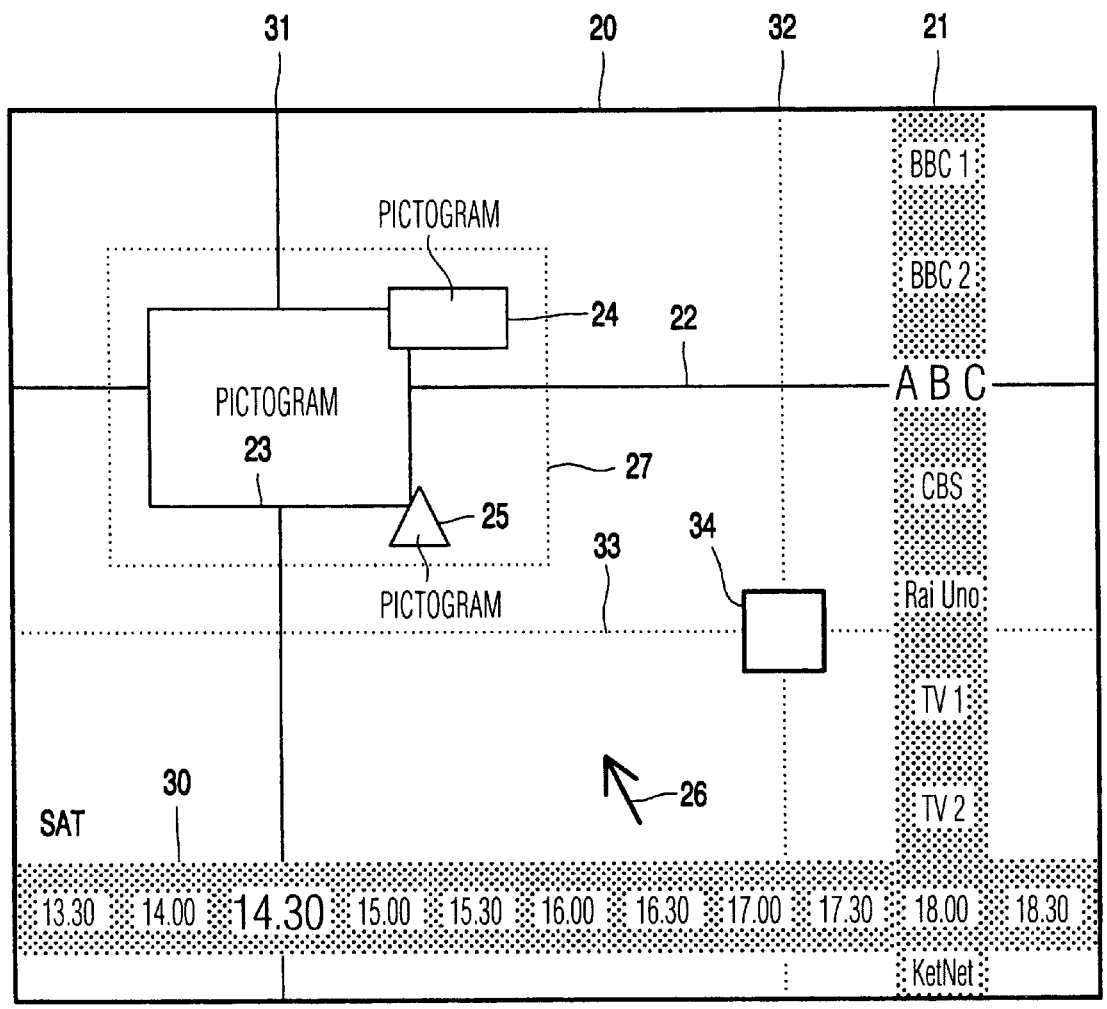
FIG. 3 shows an example of a screen representation of an EPG in accordance with a further embodiment of the method according to the invention.

FIG. 3 shows an example of a screen representation of an EPG in accordance with a further embodiment of the method according to the invention. Elements with the same reference numerals as in FIG. 2 are identical or similar. With respect to the previous embodiment, another attribute, i.e. channel name, has been assigned to the axis 21, and a second horizontal axis 30 is displayed, representing the broadcast time. Along the axis 30 clock times are shown, corresponding to half hours. On the left-hand side an indication of the day of the week is displayed, i.e. 'SAT' meaning 'Saturday'. The axis 30 can be shifted in a similar way as the axis 21, and furthermore it can be relocated and assigned a new attribute, provided the new attribute is different from the attribute assigned to the axis 21. The pictogram 27 now presents information relating to programs which correspond to the selected values of both axes, indicated by the line 22 and an additional line 31. In the example, the pictogram 27 shows information relating to a program which is or will be broadcast at 14.30 by the channel 'ABC'. Because the broadcast time and the channel uniquely determine a program, no other programs need be presented by the pictogram 27. If the axis 21 would have been assigned the program category attribute, like the previous embodiment, the pictogram 27 would show information about all programs of a selected category which are broadcast at the selected time, i.e. Saturday 14.30, in a way as described hereinbefore. Dragging the pictogram 27 causes both the selected broadcast time and the selected channel name to be adjusted, the former in accordance with the horizontal component of dragging, and the latter in accordance with the vertical component of the dragging. Dragging the pictogram 27 to the top-left corner or the bottom-right corner causes both axes to shift simultaneously.

An advanced embodiment of the apparatus according to the invention may comprise means (not shown) for storing the 'path' through the coordinate system defined by the axis or axes. If the pictogram 27 is being dragged quickly, the user may catch a glimpse of an interesting preview and have difficulty in finding the corresponding coordinates again. Said means could assist the user in backtracking said path through the coordinate system. Alternatively, the user may be allowed to leave a bookmark at the corresponding position to facilitate returning to that position. The bookmark may, for example, be represented as a particular symbol at said position, or it may be selectable from a bookmark list.

A smaller second pictogram 34 is presented, also corresponding to the selected values of both axes, indicated by the lines 32 and 33. The pictogram 34 shows a symbol indicating a program which might be of interest to the user. The symbol may indicate, for example, the category of the promoted program, or a small picture fragment. It may also be a smaller or similar version of the pictogram 27, capable of presenting preview motion pictures. If the user is interested, he may drag the pictogram 27 to the position of the pictogram 34, to obtain more comprehensive information about the promoted program. If the user does not react, the pictogram 34 is removed after a certain period of time. The pictogram 34 may also be applied to show a promotion clip of, for example, a product or a service provider. The content and timing of the pictogram 34 may be based on information supplied by a service provider, or it may be based on locally stored information, e.g. a user profile.

Although the invention has been described with reference to particular illustrative embodiments, variants and modifications are possible within the scope of the inventive concept.

For example, instead of selecting only one value per axis, multiple values or ranges of values, e.g. a time range, may be selected. The pictogram 27 would then show information about all programs corresponding to all selected values and/or ranges.

Also, a new attribute value may be selected by directly selecting a new position within the display screen, e.g. by pointing and clicking with a mouse. The coordinate of the new position with respect to the axis determines the newly selected attribute value. If the screen resolution is high enough, multiple pictograms may be shown at the same time, e.g. at positions which have been selected previously, as a reminder to the user.

In a further embodiment, a sound signal may be attached to the pictogram and sent to a speaker system. The pictogram may thus be a small fragment of a movie, including moving pictures and sound. This small fragment could be repeated indefinitely, or it could freeze at the end of it. Instead of one or two axes, multiple axes could be applied, and displayed for example as a three-dimensional image.

The user may be allowed to adjust the size of the pictogram.

The word 'comprising' does not exclude the presence of elements or steps other than those listed in a claim.

In summary, the invention relates to a method of and apparatus for displaying an electronic program guide. The method comprises the step of displaying an axis (21) on the screen (20) which corresponds to a particular program attribute (e.g. channel name, broadcast time, program category, program title). The user may select a value from the axis, causing a pictogram (27) to be displayed, showing information about programs corresponding to the selected value. The pictogram's position corresponds to the position of the selected value. A new value may be selected by dragging the pictogram and/or shifting the axis.

What is claimed is:

1. A method of displaying an electronic program guide, comprising the step of receiving attribute values relating to program attributes, wherein the method further comprises the steps of:

displaying values relating to a selected program attribute on a display screen along a coordinate axis;

user-operably selecting a value of said program attribute; and displaying a pictogram representative of a program which corresponds with the currently selected value, the pictogram's position having a coordinate along said coordinate axis which corresponds to the currently selected attribute value;

wherein the step of selecting a value comprises dragging the pictogram to a new position on the display screen, the new position's coordinate along said coordinate axis determining a newly selected value.

2. A method as claimed in claim 1, wherein when the pictogram is dragged until its coordinate reaches an extremity of the coordinate axis, the step of shifting said coordinate axis is performed to obtain a subsequent adjustment of the selected value.

3. A method as claimed in claim 1, wherein the method further comprises a step of user-operably assigning another one of the program attributes to the coordinate axis.

4. A method as claimed in claim 1, wherein the method further comprises displaying values relating to a further one of the program attributes on the display screen along a further coordinate axis, the method proceeding similarly with respect to the combination of said coordinate axis and said further coordinate axis.

5. A method as claimed in claim 1, said program attribute is the channel number and said further program attribute is the broadcast time.

6. A method of displaying an electronic program guide, comprising the step of receiving attribute values relating to program attributes, wherein the method further comprises the steps of:

displaying values relating to a selected program attribute on a display screen along a coordinate axis;

user-operably selecting a value of said program attribute; and displaying a pictogram representative of a program which corresponds with the currently selected value, the pictogram's position having a coordinate along said coordinate axis which corresponds to the currently selected attribute value;

wherein the step of selecting a value comprises shifting said coordinate axis, the pictogram's coordinate determining a newly selected value.

7. A method as claimed in claim 6, wherein that the speed of shifting said coordinate axis is proportional to the difference between the pictogram's coordinate and the coordinate of a user-adjustable cursor position.

8. A method of displaying an electronic program guide, comprising the step of receiving attribute values relating to program attributes, wherein the method further comprises the steps of:

displaying values relating to a selected program attribute on a display screen along a coordinate axis;

user-operably selecting a value of said program attribute; and displaying a pictogram representative of a program which corresponds with the currently selected value, the pictogram's position having a coordinate along said coordinate axis which corresponds to the currently selected attribute value;

wherein the method further comprises the step of receiving data to indicate a program of particular interest, and the step of displaying a symbol representing such a program at a position having a coordinate in accordance with the program's value relating to the selected program attribute.

9. An apparatus for receiving a plurality of programs, comprising decoding means for receiving and decoding attribute values relating to program attributes, wherein the apparatus further comprises display means for displaying values relating to a selected program attribute on a display screen along a coordinate axis, and selection means for user-operably selecting a value of said program attribute, the display means being adapted to display a pictogram representative of a program which corresponds with the currently selected value, the pictogram's position having a coordinate along said coordinate axis which corresponds to the currently selected attribute value, wherein the selection means comprise dragging means for dragging the pictogram to a new position on the display screen, the new position's coordinate along said coordinate axis determining a newly selected value.

10. An apparatus as claimed in claim 9, wherein the decoding means are further adapted to receive data to indicate a program of particular interest, the display means being adapted to display a symbol representing such a program at a position having a coordinate in accordance with the program's value relating to the selected program attribute.

11. An apparatus as claimed in claim 9, wherein the apparatus further comprises assigning means for user-operably assigning another one of the program attributes to the coordinate axis.

12. An apparatus as claimed in claim 9, wherein the display means are further adapted to display values relating to a further one of the program attributes on the display screen along a further coordinate axis, the selection means being adapted to operate similarly with respect to the combination of said coordinate axis and said further coordinate axis.

13. An apparatus for receiving a plurality of programs, comprising decoding means for receiving and decoding attribute values relating to program attributes, wherein the apparatus further comprises display means for displaying values relating to a selected program attribute on a display screen along a coordinate axis, and selection means for user-operably selecting a value of said program attribute, the display means being adapted to display a pictogram representative of a program which corresponds with the currently selected value, the pictogram's position having a coordinate along said coordinate axis which corresponds to the currently selected attribute value, wherein the selection means comprise shifting means for shifting said coordinate axis, the pictogram's coordinate determining a newly selected value.

14. An apparatus as claimed in claim 13, the display means being adapted to display a cursor at a user-adjustable position, wherein the shifting means are adapted to shift said coordinate axis at a speed which is proportional to the difference between the pictogram's coordinate and the coordinate of the cursor's position.

* * * * *